Patented Aug. 28, 1951

2,566,184

UNITED STATES PATENT OFFICE 2,566,184

DEESTERIFIED POLYMERS WHICH BECOME INSOLUBLE IN WATER WHEN THE AQUEOUS SOLUTIONS ARE EVAPORATED FROM THEIR HYDROSOLS

William F. Fowler, Jr., and William O. Kenyon, Rochester, N. Y., assignors to Eastman Kodak Company, Rochester, N. Y., a corporation of New Jersey No Drawing. Application March 11, 1948, Serial No. 14,394

14 Claims. (Cl. 260—85.7)

1

This invention relates to deesterified resinous copolymers and more particularly to deesterified resinous copolymers of diacylates of aliphatic aldehydes containing a carbon-to-carbon double bond with homopolymerizable vinyl esters of lower fatty acids. It also relates to a process for their preparation.

It is known that diacylates of unsaturated aldehydes containing an aliphatic carbon-to-carbon double bond such as, for example, acrolein diacetate, acrolein dipropionate, crotonaldehyde dipropionate, etc., do not homopolymerize to high molecular weight resins by heating with organic peroxide polymerization catalysts, but can be readily copolymerized with homopolymerizable unsaturated compounds to give useful resinous copolymers. These copolymers are thermoplastic and soluble in common organic solvents such as acetone, 1,4-dioxane, ethyl acetate, etc., which properties are of value for easy workability into a limited variety of shaped objects. However, none of these copolymers can be used for the preparation of materials where insolubility is advantageous, for example, for the preparation of solvent-proof and water-proof textile materials.

We have now found that certain resinous diacylates which may be prepared as described in U. S. Patent 2,417,404, dated March 11, 1947, can be deesterified under specific conditions to give reversible hydrogels, which on drying at ordinary or elevated temperatures become insoluble in water or in common organic solvents or in their admixtures. These products are differentiated from known materials which become insoluble on contact with atmospheric oxygen. The insolubilization of our new hydrogels is not an oxidation process, since similar products result, whether the drying takes place in contact with the air, in vacuum or in an inert atmosphere such as nitrogen, carbon dioxide, etc. The new deesterified resinous copolymers in their hydrogel form can be heated to give homogeneous solutions (hydrosols) which can be cast into films and sheets or spun into threads, as desired, and the materials so obtained, upon drying are transparent, insoluble, tough and flexible at normal room temperatures.

It is, accordingly, an object of our invention to provide water-soluble synthetic polymeric materials which become insoluble upon separation of the materials from their aqueous solutions. A further object is to provide a process for preparing such materials. Other objects will become apparent hereinafter.

2

In accordance with our invention, we prepare our new synthetic materials by deesterifying a copolymer prepared from vinyl acetate and an unsaturated aliphatic aldehyde diacylate such as, for example, acrolein diacetate, acrolein dipropionate, acrolein diisobutyrate, α-ethacrolein diacetate, α-ethacrolein dipropionate, α-ethacrolein diisobutyrate, α-chloracrolein diacetate, α-chloracrolein dipropionate, α-chloracrolein diisobutyrate, α-methacrolein diacetate, α-methacrolein dipropionate, α-methacrolein diisobutyrate, crotonaldehyde diacetate, crotonaldehyde dipropionate, crotonaldehyde diisobutyrate, α-chlorocrotonaldehyde diacetate, α-chlorocrontonaldehyde dipropionate, α-chlorocrotonaldehyde diisobutyrate, α-methyl crotonaldehyde diacetate, α-methyl crotonaldehyde dipropionate, and α-methyl crotonaldehyde diisobutyrate.

The polymerization of the intermediate monomeric mixtures of the invention is accelerated by heat and by polymerization catalysts which are known to accelerate the polymerization of polymerizable vinyl and acrylic compounds. Exemplary of such catalysts are the organic peroxides (e. g. benzoyl peroxide, acetyl benzoyl peroxide and lauroyl peroxide), hydrogen peroxide, perborates (e. g. sodium perborate) and persulfates (e. g. sodium persulfate or potassium persulfate). The preferred ratio of monomers in the original copolymerization mixtures can be varied from 94 to 99.7 parts by weight of vinyl acetate and from 6.0 to 0.3 parts by weight of the unsaturated aldehyde diacylate. The copolymerizations can be effected in mass or in the presence of a diluent. The diluent, if employed, is advantageously though not necessarily, a solvent for the copolymer such as an alcohol, a ketone, benzene, etc. The mixture of monomers can also be emulsified in a liquid in which they are insoluble (e. g. water) and the emulsion subjected to polymerization. The monomers can also be suspended in water using a relatively poor dispersing agent such as starch and polymerized in the form of granules or beads. The temperature of polymerization can be varied from 30° to 120° C., preferably 50°–100° C.

The deesterification of the copolymers above described is advantageously carried out in an acid medium. Advantageously, the deesterification can be effected with an alcoholic deesterifying agent and a deesterification catalyst. Alcohols such as methanol, ethanol, the propanols and the butanols, are advantageously used. Any of the known esterification catalysts are suitable, such as hydrogen bromide, sulfuric acid, etc., although hydrogen chloride is especially efficacious. The concentration of catalyst is not critical. For example, when the deesterification is conducted in a methanol medium, the catalyst can be varied from 0.1 mole to 0.5 mole per liter of reaction mixture. The deesterification is carried out preferably at room temperature, although satisfactory deesterified products are obtainable throughout the range of 15° to 45° C. The deesterified water-soluble products of our invention contain none of the acylate groups originally attached to the diacylate compound and from less than 0.5 per cent to not more than 2.5 per cent by weight of the original acetate groups. These products in hydrosol form contain linear polymeric chains which probably become cross-linked upon separation from the water. Where the deesterification is carried out in an alcoholic solution, the concentration of copolymer can be varied from 1 to 20 per cent by weight of the copolymer to from 99 to 80 per cent by weight of the alcohol.

The following examples will serve to illustrate our new materials and the manner of preparing the same.

*Example 1.—Deesterification of the copolymer of α-methacrolein dipropionate and vinyl acetate*

475 grams of vinyl acetate, 25 grams of α-methacrolein dipropionate and 0.5 gram of benzoyl peroxide were sealed in a tube and heated at 50° C. for a period of 10 days. The tube was then opened and the solid copolymer dissolved in acetone. The acetone solution was poured into boiling distilled water to precipitate the copolymer. Steam was then passed through the suspension of copolymer in water to remove unreacted monomers and acetone, after which the copolymer was dried in an air oven at 50° C. Analysis of the final copolymer product showed that it contained 3.3 per cent by weight of propionyl groups equivalent to 5.8% by weight of α-methacrolein dipropionate groups and over 94 per cent by weight of vinyl acetate groups.

400 grams of the copolymer prepared as described above were dissolved in 4000 c. c. (equivalent to 3170 grams) of methanol, and while stirring, there were added dropwise 200 c. c. of 3.52 normal hydrogen chloride in methanol (equivalent to 212 grams of a mixture of 12.0 per cent by weight of hydrogen chloride and 88.0 per cent of weight of methanol). The mixture was then allowed to stand at room temperature for a period of 96 hours. At the end of this time, the mixture had set to a hard gel. The gel was cut into thick slices and the slices washed at 4° C. running water for a period of 24 hours. The gel slices were thereafter placed in an Erlenmeyer flask and heated in a hot water bath at 60° C. for about 30 minutes. The viscous smooth-flowing dope was obtained. The pH of the dope solution was 2.10. The dope was coated into films and the films permitted to dry for 3 hours at 50° C. The dried films were transparent, tough and flexible, and were insoluble in boiling water, in strong aqueous alkaline solutions and in common solvents such as methanol acetone, etc. The analysis of the films indicated that no diacylate groups were present, while acetate groups were present in amount less than 1 per cent by weight.

In similar manner as in the above example, copolymers of α-methacrolein diacetate and vinyl acetate, α-methacrolein diisobutyrate and vinyl acetate, α-ethacrolein diacetate and vinyl acetate, α-ethacrolein dipropionate and vinyl acetate, α-ethacrolein diisobutyrate and vinyl acetate, α-chloracrolein diacetate and vinyl acetate, α-chloracrolein dipropionate and vinyl acetate or α-chloracrolein diisobutyrate and vinyl acetate may be prepared to contain from 0.3 to 6.0 per cent by weight of the unsaturated aldehyde diacylate groups in each kind of copolymer and these may then be deesterified to give products having properties similar in character to those of the deesterified product of the above example.

*Example 2.—Deesterification of the copolymer of crotonaldehyde dipropionate and vinyl acetate*

(a) 243.75 grams of vinyl acetate, 6.25 grams of crotonaldehyde dipropionate and 0.25 gram of benzoyl peroxide were sealed in a brown bottle and heated in a water bath at 50° C. for a period of 4 days. At the end of this time the solution in the bottle had set to a solid mass. The contents of the bottle were then dissolved in acetone and the solution poured into hot distilled water to precipitate the copolymer. To remove unreacted monomers and solvent, steam was passed through the suspension of the copolymer in water for four hours. The copolymer was filtered off and dried at 50° C. in an air cabinet. Analysis of the dried copolymer gave a content of 2.9 per cent by weight of crotonylidene dipropionate groups indicating thereby that the monomers had copolymerized substantially in the proportions present in the original polymerization mixture.

200 grams of the copolymer prepared as described above were dissolved in 1800 c. c. (equivalent to 1426 grams) of methanol and while stirring, there were added dropwise 90 c. c. of 3.52 normal hydrogen chloride in methanol (equivalent to 95.4 grams of a mixture of 12.0 per cent by weight of hydrogen chloride and 88.0 per cent by weight of methanol). The mixture was then allowed to stand at room temperature for 24 hours. At the end of this time, a rigid gel had formed. The gel was removed from the flask, cut into slices and the latter washed for 24 hours in 4° C. running water. The gel slices were thereafter placed in an Erlenmeyer flask and heated in a hot water bath at 60° C. for about 30 minutes. A viscous smooth-flowing dope having a pH value of 1.69 was obtained. The films obtained by coating this dope and drying the coatings at 50° C. over a period of four hours were transparent, tough and flexible. The dried films were insoluble in boiling water in strong aqueous alkaline solutions and in common organic solvents such as methanol, acetone, etc. Analysis of the dried product showed the absence of diacylate groups, while acetate groups were present in the amount of approximately 2 per cent by weight.

(b) 176 grams of copolymer similar to the one described in the preceding example (a), but containing 4.84 per cent by weight of crotonylidene dipropionate groups, were dissolved in 1700 c. c. (equivalent to 1346 grams) of methanol, and while stirring, there were added dropwise 85 c. c. of 3.52 normal hydrogen chloride in methanol (equivalent to 90 grams of a mixture of 12.0 per cent by weight of hydrogen chloride and 88.0 per cent by weight of methanol). The hard gel which formed was treated in similar manner as in example (a). The dope obtained had a pH of 1.56. The coated film after drying for a period of four hours was insoluble in boiling water and in common organic solvents.

In similar manner as the above Example 2, copolymers of crotonaldehyde diacetate and vinyl acetate, crotonaldehyde diisobutyrate and vinyl acetate, α-methyl crotonaldehyde diacetate and vinyl acetate, α-methyl crotonaldehyde dipropionate and vinyl acetate or α-methyl crotonaldehyde diisobutyrate and vinyl acetate may be prepared to contain from 0.3 to 6.0 per cent by weight of the unsaturated aldehyde diacylate groups in each kind of copolymer, and these may then be deesterified as indicated by the above example to give products having properties similar in character to that of the example.

*Example 3.—Deesterification of the copolymer of α-chlorocrotonaldehyde diacetate and vinyl acetate*

200 grams of α-chlorocrotonaldhyde, 525 grams of acetic anhydride and 10 drops of concentrated sulfuric acid were mixed together in a flask and heated under a total reflux condenser on a steam bath for a period of 16 hours. After cooling, the mixture was washed with several changes of distilled water, then with aqueous 10 per cent sodium carbonate solution and finally with a mixture of distilled water and ether, agitating vigorously in the final wash. The ether layer was decanted and treated with anhydrous magnesium sulfate for a period of 4 hours, filtered, and the ether then eliminated by distillation. The residue was distilled under reduced pressure through a fractionating column. The fraction boiling 126° to 129° C. at 23 mm. pressure was collected and shaken with powdered calcium carbonate, filtered, and redistilled by means of a modified Claisen distilling apparatus. Analysis of the above purified fraction gave a content of 17.97 per cent chlorine as compared with the calculated theory of 17.20 per cent, indicating thereby that a substantially pure compound of α-chlorocrotonaldehyde diacetate has been obtained.

190 grams of vinyl acetate, 10 grams of α-chlorocrotonaldehyde diacetate, prepared as described above, and 0.20 grams of benzoyl peroxide were sealed in a brown bottle and heated in a water bath at 50° C., for a period of 14 days. At the end of this time, the solution had set to a solid mass. The solid was dissolved in acetone and the solution poured into steaming hot water. The resulting precipitate of copolymer was then washed with water and dried. Analysis of the dried copolymer gave a content of 5.5 per cent by weight of α-chlorocrotonaldehyde diacetate groups indicating thereby that the monomers had copolymerized in about the proportions present in the original polymerization mixture.

69 cc. of 3.52 normal hydrogen chloride in methanol (equivalent to 75.3 grams of a mixture of 12.0 per cent by weight of hydrogen chloride and 88.0 per cent by weight of methanol) were added dropwise, while stirring, to 1425 cc. of a 10 per cent dope of the copolymer of α-chlorocrotonaldehyde diacetate and vinyl acetate prepared as described in the preceding. The dope mixture was allowed to stand at room temperature for a period of 48 hours. At the end of this time, a hard, opaque gel had formed. The gel was cut into slices and the slices washed for 16 hours in 4° C. running water. The gel slices were then placed in a flask and melted to a solution under a hot water tap. The solution was coated onto glass plates. After drying at room temperature for 16 hours, the films so obtained were subjected to an additional 2 hour drying period at 50° C. The resulting film was tough and flexible and was insoluble in boiling water, in strong aqueous sodium hydroxide and in common organic solvents. Analysis of the dried product showed the absence of diacylate groups, while the acetate groups were present in the amount of 2 per cent by weight.

In similar manner as described in the above example, copolymers of α-chlorocrotonaldehyde and vinyl acetate or α-chlorocrotonaldehyde diisobutyrate and vinyl acetate may be prepared to contain from 0.3 to 6.0 per cent by weight of the unsaturated aldehyde diacylate groups in each kind of copolymer, and these may then be deesterified as indicated by the above example to give products having properties similar in character to that of the example.

We claim:

1. A deesterified polymer which becomes insoluble in water when the aqueous solution is evaporated from its hydrosol, the said deesterified polymer having resulted from the deesterification, in solution in a monohydric saturated aliphatic alcohol containing from 1 to 4 carbon atoms and in the presence of an acid deesterification catalyst, of a copylymer of vinyl acetate and a diacylate of a monocarboxylic acid selected from the group consisting of aceticacid, propionic acid and isobutyric acid and an unsaturated aldehyde selected from the group consisting of α-methacrolein, cotonaldehyde, and α-chlorocrotonaldehyde, said copolymer containing from 0.3 to 6.0 per cent by weight of the unsaturated aldehyde diacylate, the deesterification having been continued until no diacylate groups and not more than 2.5 per cent by weight of acetate groups are present in the deesterified polymer.

2. A deesterified polymer which becomes insoluble in water when the aqueous solution is evaporated from its hydrosol, the said deesterified polymer having resulted from the deesterification, in solution in a monohydric saturated aliphatic alcohol containing from 1 to 4 carbon atoms and in the presence of an acid deesterification catalyst, of a copylmer of vinyl acetate and α-methacrolein dipropionate, said copolymer containing from 0.3 to 6.0 per cent by weight of α-methacrolein dipropionate, the deesterification having been continued until no diacylate groups and not more than 2.5 per cent by weight of acetate groups are present in the deesterified polymer.

3. A deesterified polymer which becomes insoluble in water when the aqueous solution is evaporated from its hydrosol, the said deesterified polymer having resulted from the deesterification, in solution in methanol and in the presence of hydrogen chloride, of a copylmer consisting of 94.2 per cent by weight of vinyl acetate and 5.8 per cent by weight of α-methacrolein dipropionate, the deesterification having been continued until no diacylate groups and not more than 2.5 per cent by weight of acetate groups are present in the deesterified polymer.

4. A deesterified polymer which becomes insoluble in water when the aqueous solution is evaporated from its hydrosol, the said deesterified polymer having resulted from the deesterification, in solution in a monohydric saturated aliphatic alcohol containing from 1 to 4 carbon atoms and in the presence of an acid deesterification catalyst, of a copylmer of vinyl acetate and crotonaldehyde dipropionate, said copolymer containing from 0.3 to 6.0 per cent by weight of crotonaldehyde dipropionate, the deesterification having been continued until no diacylate groups and not more than 2.5 per cent by weight of acetate groups are present in the deesterified polymer.

5. A deesterified polymer which becomes insoluble in water when the aqueous solution is evaporated from its hydrosol, the said deesterified polymer having resulted from the deesterification, in solution in methanol and in the presence of hydrogen chloride, of a copolymer consisting of 97.1 per cent by weight of vinyl acetate and 2.9 per cent by weight of crotonaldehyde dipropionate, the deesterification having been continued until no diacylate groups and not more than 2.5 per cent by weight of acetate groups are present in the deesterified polymer.

6. A deesterified polymer which becomes insoluble in water when the aqueous solution is evaporated from its hydrosol, the said deesterified polymer having resulted from the deesterification, in solution of a monohydric saturated aliphatic alcohol containing from 1 to 4 carbon atoms and in the presence of an acid deesterification catalyst, of a copolymer of vinyl acetate and $\alpha$-chlorocrotonaldehyde diacetate, said copolymer containing from 0.3 to 6.0 per cent by weight of $\alpha$-chlorocrotonaldehyde diacetate, the deesterification having been continued until no diacylate groups and not more than 2.5 per cent by weight of acetate groups are present in the deesterified polymer.

7. A deesterified copolymer which becomes insoluble in water when the aqueous solution is evaporated from its hydrosol, the said deesterified polymer having resulted from the deesterification in solution in methanol and in the presence of hydrogen chloride, of a copolymer consisting of 94.5 per cent by weight of vinyl acetate and 5.5 per cent by weight of $\alpha$-chlorocrotonaldehyde diacetate, the deesterification having been continued until no diacylate groups and not more than 2.5 per cent by weight of acetate groups are present in the deesterified polymer.

8. A process for preparing a deesterified polymer which becomes insoluble when the aqueous solution is evaporated from its hydrosol, comprising deesterifying, in solution in a monohydric saturated aliphatic alcohol containing from 1 to 4 carbon atoms and in the presence of an acid deesterification catalyst, a copolymer of of vinyl acetate and a diacylate of a monocarboxylic acid selected from the group consisting of acetic acid, propionic acid and isobutyric acid and an unsaturated aldehyde selected from the group consisting of $\alpha$-methacrolein, crotonaldehyde, and $\alpha$-chlorocrotonaldehyde, said copolymer containing from 0.3 to 6.0 per cent by weight of the unsaturated aldehyde diacylate, until a deesterified polymer containing no diacylate groups and not more than 2.5 per cent by weight of acetate groups is obtained.

9. A process for preparing a deesterified polymer which becomes insoluble in water when the aqueous solution is evaporated from its hydrosol, comprising deesterifying, in solution in a monohydric saturated aliphatic alcohol containing from 1 to 4 carbon atoms and in the presence of an acid deesterification catalyst, a copolymer of vinyl acetate, and $\alpha$-methacrolein dipropionate, said copolymer containing from 0.3 to 6.0 per cent by weight of $\alpha$-methacrolein dipropionate, until a deesterified polymer containing no diacylate groups and not more than 2.5 per cent by weight of acetate groups is obtained.

10. A process for preparing a deesterified polymer which becomes insoluble in water when the aqueous solution is evaporated from its hydrosol, comprising deesterifying, in solution in methanol and in the presence of hydrogen chloride, a copolymer consisting of 94.2 per cent by weight of vinyl acetate and 5.8 per cent by weight of $\alpha$-methacrolein dipropionate, until a deesterified polymer containing no diacylate groups and not more than 2.5 per cent by weight of acetate groups is obtained.

11. A process for preparing a deesterified polymer which becomes insoluble in water when the aqueous solution is evaporated from its hydrosol, comprising deesterifying, in solution in a monohydric saturated aliphatic alcohol containing from 1 to 4 carbon atoms and in the presence of an acid deesterification catalyst, a copolymer of vinyl acetate and crotonaldehyde dipropionate, said copolymer containing from 0.3 to 6.0 per cent by weight of crotonaldehyde dipropionate, until a deesterified polymer containing no diacylate groups and not more than 2.5 per cent by weight of acetate groups is obtained.

12. A process for preparing a deesterified polymer which becomes insoluble in water when the aqueous solution is evaporated from its hydrosol, comprising deesterifying in solution in methanol and in the presence of hydrogen chloride, a copolymer consisting of 97.1 per cent by weight of vinyl acetate and 2.9 per cent by weight of crotonaldehyde dipropionate, until a deesterified polymer containing no diacylate groups and not more than 2.5 per cent by weight of acetate groups is obtained.

13. A process for preparing a deesterified polymer which becomes insoluble in water when the aqueous solution is evaporated from its hydrosol, comprising deesterifying, in solution in a monohydric saturated aliphatic alcohol containing from 1 to 4 carbon atoms and in the presence of an acid deesterification catalyst, a copolymer of vinyl acetate and $\alpha$-chlorocrotonaldehyde diacetate, said copolymer containing from 0.3 to 6.0 per cent by weight of $\alpha$-chlorocrotonaldehyde diacetate, until a deesterified polymer containing no diacylate groups and not more than 2.5 per cent by weight of acetate groups is obtained.

14. A process for preparing a deesterified polymer which becomes insoluble in water when the aqueous solution is evaporated from its hydrosol, comprising deesterifying, in solution in methanol and in the presence of hydrogen chloride, a copolymer consisting of 94.5 per cent by weight of vinyl acetate and 5.5 per cent by weight of $\alpha$-chlorocrotonaldehyde diacetate, until a deesterified polymer containing no diacylate groups and not more than 2.5 per cent by weight of acetate groups is obtained.

WILLIAM F. FOWLER, Jr.
WILLIAM O. KENYON.

REFERENCES CITED

The following references are of record in the file of this patent:

UNITED STATES PATENTS

| Number | Name | Date |
| --- | --- | --- |
| 2,417,404 | Minsk | Mar. 11, 1947 |
| 2,443,167 | Minsk | June 8, 1948 |
| 2,467,430 | Izard | Apr. 19, 1949 |
| 2,477,462 | McQueen | July 26, 1949 |
| 2,478,154 | Evans | Aug. 2, 1949 |
| 2,478,495 | Marvel | Aug. 9, 1949 |
| 2,485,239 | Izard | Oct. 18, 1949 |